May 9, 1967  R. B. FAST  3,318,706
PROCESS FOR PREPARING A COATED READY-TO-EAT CEREAL PRODUCT
Filed Feb. 11, 1964
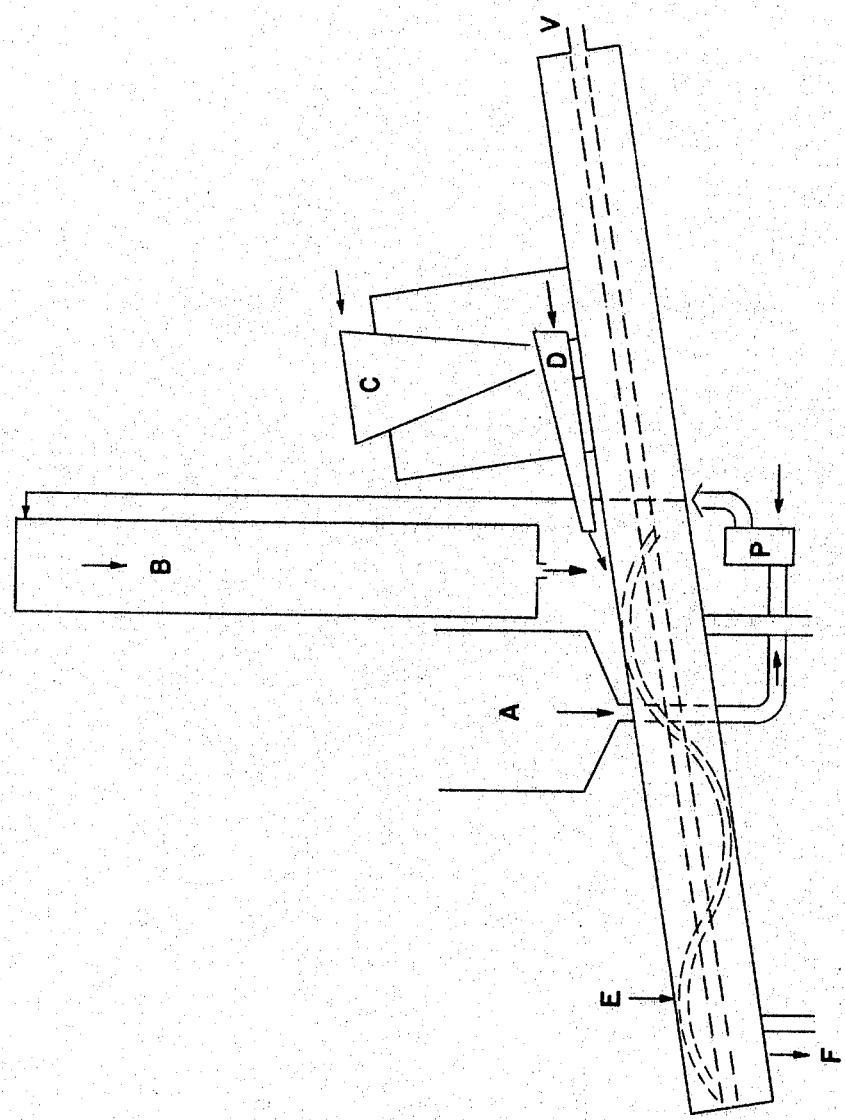
INVENTOR.
Robert B. Fast
BY
Patent Agt.

United States Patent Office 3,318,706
Patented May 9, 1967

3,318,706
PROCESS FOR PREPARING A COATED READY-TO-EAT CEREAL PRODUCT
Robert B. Fast, Glen Rock, N.J., assignor to National Biscuit Company, a corporation of New Jersey
Filed Feb. 11, 1964, Ser. No. 344,033
5 Claims. (Cl. 99—83)

This invention relates to a new and improved process for the production of ready-to-eat breakfast cereals. More particularly, the invention relates to a method of preparing cereal products in the form of sugar-coated cereals.

Heretofore, in the sugar coating industry, it has been the practice to use a sugar solution usually at 250°–270° F., thin enough so as to be applied homogeneously throughout the cereal products. Frequently, an oil, such as for instance coconut oil, has been added to decrease foaming during the operation and to promote the separation of the coated particles. For instance, U.S.P. 2,196,395 discloses a process where the cereal material is coated with a liquid composition and then dried in an oven.

The disadvantage resulting from such process is obvious, because it is necessary to heat the finished products, in order to allow the water from the coating solution to evaporate and the candy syrup to solidify. Another disadvantage is that frequently during evaporation, the sugar solidifies, turning white and frosted and giving an undesirable appearance. Also, the cereal material picks up water and becomes soggy.

An alternative process has been used, as described for instance in U.S.P. 3,094,947, which comprises melting all the dry ingredients and applying the molten candy to the cereal bodies. The disadvantages of this procedure reside in the necessity of accurately weighing solid materials during the operation, which, in a continuous process, requires additional metering devices, and in the possibility of over heating the sugar syrup during the process of melting the dry ingredients. Particularly with sucrose, the melting step requires raising the temperature to 340° F., with possibility of the reaction becoming exothermic, reaching a temperature as high as 380° F., with consequent complete caramelization and damage to the apparatus. Another disadvantage resulting from the application of the molten candy composition to fragile puffed cereal bodies, is that considerable breakage may occur with substantial loss to the manufacturer.

For the purpose of imparting full flavor to the candy composition, partial caramelization of the candy syrup has been frequently utilized. Although, undoubtedly, beneficial for the purpose of developing the flavor, caramelization has disadvantages, because it is accompanied by an acrid, sharp and burnt taste, detectable by the consumer.

The object of this instant invention is to provide a process whereby the finished cereal products have full flavor, without the development of the burnt and acrid taste, which accompanies caramelization.

Another object of this instant invention is to provide a process whereby the candy coating is homogenesously applied without appreciable breakage, with homogeneous moisture content not over 3.5% and with longer shelf-life than candy-coated cereals, prepared by conventional methods.

Still another object is to provide a process which may be run continuously, which is economical and superior in cost to other processes heretofore known.

Another object is to provide a candy composition which contains controlled uniform content of invert syrup, sufficient to avoid crystallization of the sugar during the operation, and which, however, is low enough to resist absorption of moisture in humid weather.

Another object of this invention is to provide a process whereby the proportion of candy composition to cereal goods is kept constant, and may be controlled, within the range 10 to 90% up to 70 to 30%. The ratio of candy composition to cereal material, is, usually, 50:50, but a range of 30% to 70% of the coating with respect to the finished product, is very satisfactory.

It is also an object of the present invention to provide a process whereby the candy-coated bodies may be cooled rapidly and homogeneously, after application of the coatings, thus providing a uniform microcrystalline or amorphous layer of sugar coating, which is responsible for the uniform transparent glossy appearance.

The instant invention is based upon the discovery that it is possible to use a sugar solution for the candy composition, thus facilitating the metering out of the sugar during the continuous operation, add to the solution the other ingredients, evaporate all the water, essentially to completion, and conduct the operation of application to the cereal material at 320° to 325° F.

Proper adjustment of the rate of feed of the cereal material and of the candy syrup, proper advance of both, the cereal material and the candy syrup during the continuous process in the blending zone, and proper rate of discharge of the coated material, provide homogeneous satisfactory coating of the cereal bodies with a residence time in the cooking zone, where the temperature is 320°–325° F., of only 20 to 50 seconds.

The advantage resulting from the process conducted at 320° to 325° F. is that, prior to the application of the coating, the water has essentially completely evaporated, giving a candy syrup with water in the amount of 0.5 to 2.0%, and further, that the syrup is more fluid at 320° to 325° F. than at 250° to 270° F. as in prior art. The greater fluidity of the candy composition at the temperature of 320°–325° F., results in greater ease in the application to the cereal bodies and essential eleminiation of breakage.

The short residence time in the cooking zone at 320°–325° F. and the use of the sugar and other ingredients in solution, rather than in the molten state, have the advantage that it is possible to evaporate the water homogeneously, without danger of overheating, which would result in complete caramelization, and even carbonization.

As it has been mentioned above and as it will be explained further hereinafter, evaporation of the water and conducting the process at 320° to 325° F., is essential to the success of the operation. Prior investigators did not consider the temperature of the candy composition during the application a critical factor. For instance, in U.S.P. 2,868,647 it is stated that the temperature of the sugar syrup is only significant in order to achieve the proper fluidity required by the different methods of application, and the different compositions of the syrup. It is also stated in the same patent that a temperature as low as 70° F. to 120° F. is satisfactory with syrups containing 60% sucrose, and that only where the syrup contains in the neighborhood of 84% sucrose, the temperature at the time of application should be 235° to 250° F.

Thus it is manifest that temperature control and the use of much higher temperatures, in the range of 320° F. to 325° F., have escaped the attention of earlier investigators. In U.S.P. 2,689,796, a process is disclosed in which the molten candy is heated to 320°–350° F., but under pressure, so that the moisture remains in the liquid state. Also in U.S.P. 3,094,947, which differs from this instant process insofar as it utilizes dry ingredients, the temperature is not claimed to be an essential factor, but it is stated that it must be sufficiently high to make the coating powder melt.

The cereal products which may be coated in accordance with the instant invention, include all the ready-to-eat products, in shredded, flaked, puffed form from a variety of cereals, for instance, corn, barley, bran, wheat, oats and rice.

The invention will now be described in detail with reference to the flow sheet. By reference to the flow sheet, the cereal material is transferred into the hopper, shown at C, and then fed at a predetermined rate through the feeder, shown at D. The cereal bodies, with a moisture content between 0.5 and 5%, may be used directly and no further drying is necessary. For instance, the cereal material, which, after puffing, usually contains between 4 and 5% of moisture, may be used directly. If further drying is desired, an oven (not shown) may be used, connected with the hopper C.

For the preparation of the candy composition in accordance with the invention, the process will be described with reference to a specific composition, it being understood, however, that many variations are possible, as it will be shown below.

A sugar solution containing 100 pounds of sugar in 50 pounds of water, is placed in the dissolving unit, shown in the Flow Sheet at A. Two pounds of glucose, preferably as honey, one tenth pound of acetic acid, 22 grams of sodium acetate, 30 pounds of invert syrup, 25 pounds of other sugars such as higher molecular weight sugars than disaccharides, dextrins, and higher molecular weight carbohydrates, are added to the dissolving unit.

It is possible also to vary the proportions of the ingredients. Thus sucrose may vary between 10% and 70%. The amount of honey may vary between 1% and 30%, the reducing sugar as invert syrup may vary between 5 and 25%, the amount of water may vary between 15 and 40%, and the carbohydrates, such as dextrins resulting from the incomplete hydrolysis of starch, may vary between 5 and 30%. The amount of acetic acid may vary between zero and 1%, and the amount of sodium acetate may vary between zero and 1%. According to the preferred embodiment, the amount of acetic acid is between .05 and 1%, and the amount of sodium acetate is between 0.02 and 1%.

The purpose of acetic acid is to provide, together with the buffering action of sodium acetate, the proper constant acidity of the medium, which is responsible for full flavor development. The acidity of the solution is kept constant at pH between 4 and 5, preferably 4.8. In addition to acetic acid, other acids may be used, such as tartaric and citric acid, together with a tartrate or citrate salt.

It is desirable to use liquid sucrose for the purpose of ease of metering or proportioning in an amount between 30% and 80%. Fine granulated sugar may also be used in combination with the liquid sucrose in all proportions up to total replacement of the liquid sucrose.

It may readily be seen that the proportion of the different ingredients are so adjusted that, after the coating operation is completed and the product ready for consumption, the proportion of sucrose in the finished product, varies between 20% and 60%, the proportion of reducing sugar as invert syrup varies between 5% and 18%, the amount of residual moisture varies between 0.5 and 3.5%, and the amount of dextrins and higher molecular weight carbohydrates, varies between 2% and 6%. The term "higher molecular weight carbohydrates" comprises dextrins, and higher molecular weight sugars than disaccharides. Mixtures of these carbohydrates may also be used.

The temperature in the dissolving unit is raised until the candy solution reaches a temperature of 240°–260° F. If fine granulated sugar is used, it is necessary to allow sufficient time for the solution to boil clear that is the solution is completely clear, which is indicative of all the ingredients especially the finely granulated sugar, being adequately dissolved. It is also necessary to insure adequate mixing of all the ingredients and also to initiate the process of water evaporation. For this purpose the dissolving unit is connected with a vent (not shown) for the steam to escape. When fine granulated sugar is used, it is preferable to have three dissolving units, so that a continuous flow of material is always provided for the next reaction zone.

If liquid sucrose is used in place of fine granulated sugar, only one continuous dissolving unit is sufficient, because less time is required for this preheating step. Usually if all fine granulated sugar is used the length of time required for this preheating step is between 5 and 15 minutes, preferably 8 minutes. On the other hand, if all liquid sucrose is used, the length of time required for the preheating step is 15 to 180 seconds. If combinations of liquid sucrose and fine granulated sugar are used, the length of time is greater than with fine granulated sugar alone, and three dissolving units are necessary because it is necessary to provide adequate mixing and prevent the material from crystallizing, which might occur due to the seeding effect of the fine granulated sugar. In this case, if combinations of fine granulated sugar and liquid sucrose are used, the length of time may be up to 20 minutes. A period of time, longer than 20 minutes is undesirable, because it would cause the syrup to crystallize due to water removal. The amount of water which evaporates at this temperature is between 15 and 60% depending on the concentration of the initial mix and is greater for the more dilute mix.

A reservoir (not shown) may be interposed between the dissolving unit and the cooking unit.

From the dissolving unit, the candy composition is then fed to the evaporating unit shown in the flow sheet at B. The rate of feeding to the cooking zone is between 1.5 and 2.5 gallons per minute, but a rate of 2.2 gallons is preferred. In this zone the candy composition is cooked to 320°–325° F. and simultaneously allowed to evaporate to a residual moisture content of 0.5 to 2%. The time for the evaporation must be carefully controlled, because, while it is necessary to evaporate the water essentially to completion, it is also necessary to prevent caramelization and to avoid superheating. A residence time of 30 seconds is preferred, but a residence time between 20 and 50 seconds is satisfactory. For this purpose, a steam-jacketed vessel is employed with steam, at 200 pounds pressure, being circulated in the jacket (not shown). For the purpose of providing external heat, it is also possible to use Dowtherm or other high boiling heat exchange fluids. The essentially complete evaporation of the water to a residual moisture between 0.5 and 2%, is achieved by providing the evaporating vessel B with a rotor to keep the candy composition in continuous agitation and allowing evaporation to occur on the sides of the vessel by depositing a thin film of candy composition. The thin film technique has proved very advantageous for complete evaporation of the solution, in the very short residence time. The evaporating zone B is provided with a vent for the escape of water vapors (not shown).

For the purpose of mixing with the cereal bodies, as it is shown in the flow sheet, the blending zone E is adapted in close proximity with the evaporator. The objective is to cut down the distance between the evaporating zone B and the blending zone E, and to prevent premature cooling and crystallization of the candy composition. The blending zone, represented in the flow sheet at E, preferably consists of a screw conveyor, between six and ten feet long, with a screw having a 1 to 3 feet lead. The jacket of the screw is kept at 300°–325° F. by external heating, for instance with Dowtherm or steam under pressure. The rate of flow is 0.5 to 2 gallons of candy syrup per minutes, preferably 1 to 2 gallons per minute. The cereal material is fed into the blending zone E continuously, at the rate between 15 to 20 pounds of cereal per minute. The length of time for adequate mixing is at least 15 seconds and not over 30 seconds.

As the flow sheet shows, the candy composition runs out from the evaporating zone B onto the blending zone, essentially at the outlet from the feeder for the cereal, that is the outlet from D. Thus the coating composition and the cereal articles travel through the entire length of the conveyor, and uniform and complete coating occurs.

The apparatus is provided with means for adjusting the speed of the conveyor, shown in the flow sheet at V. Too rapid speed, for instance, 45 r.p.m., causes some breakage of the cereal articles. Optimum speed is 28 to 30 r.p.m., while further decrease in the speed gives no advantage. Although a screw conveyor for the cereal bodies with the candy composition being fed therein, is the preferred embodiment of the invention, as shown in the flow sheet, other devices for the application of the candy composition onto the cereal material are within the scope of this invention. Thus an atomizer or a suitable spraying apparatus or a tumbling device may also be used.

The coated cereal bodies are then discharged to a conveyor belt, from the outlet shown at F. The rate of discharge of the candy-coated cereals is between 35 and 40 pounds per minute and preferably 36 pounds per minute. The temperature of the coated articles, after leaving the screw conveyor, drops to 150° F., in the course of 50 seconds. A cooling tunnel may be inserted before the material reaches the packaging room, which is preferably kept at 70° to 75° F., and relative humidity about 30%. It may be advantageous, during the cooling step and before packaging, to subject the material to the action of a suitable device, for instance a roller, with spikes in order to break the mass of coated cereals, which have a tendency to form a conglomerate.

The following is a specific example of the application of the invention to practice. It will be understood, however, that this example is purely illustrative and that the invention is not to be considered as limited to the particular ingredients and data given therein.

EXAMPLE 1

A candy composition was prepared batchwise from 1400 pounds of finely granulated sugar, 700 pounds of water, 200 pounds of invert syrup, 40 pounds of honey, and 230 pounds dextrins. When prepared on a batch basis and when fed to the dissolving tank A, at the rate of 112.5 gallons per hour, the amounts indicated are sufficient for 2.3 hours.

A solution of the candy composition may also be continuously prepared in the dissolving tank A by adding 85.5 pounds of invert syrup per hour, to a sucrose solution, containing 600 pounds of sucrose in 36 gallons of water per hour, adding 20 pounds of honey, acetic acid 0.5 pound, sodium acetate 0.25 pound per hour and adding dextrins at the rate of 97.5 pounds per hour.

The temperature in the dissolving vessel was raised to 250°–260° F., during a period of 8 minutes, when the solution boiled clear. Steam was passed externally in the jacket of the dissolving vessel at 0–150 p.s.i.g. pressure; with some evaporation occurring during the 8 minute heating. The solution was then continuously transferred to the evaporating zone, at the rate of 2.2 gallons per minute. As evaporator, a Baker-Perkins continuous cooker was advantageously used. The apparatus is provided with a rotor with paddles, which rotates at 584 r.p.m. and throws the solution on the sides of the vessel, permitting evaporation of the candy solution in the form of a continuous thin film. The temperature was raised to 320°–325° F., by external heat applied to the cooker with steam under 200 p.s.i.g. Evaporation of the solution was achieved with a residence time of 30 seconds and a loss of water by evaporation of 0.2 gallon per minute.

The syrup was then allowed to run onto the screw conveyor, which was mounted under the cooker at the rate of 2 gallons per minute. Puffed wheat, containing 4.5% moisture, was transferred into the hopper C, and fed through D at the rate of 16 pounds per minute. The material was added gradually by a vibrator, of the type which is suitable for controlled feeding of solid material on a continuous scale and is provided with a screen for removing dust particles. The residence time in the conveyor was 20 seconds.

The resulting product was crisp, free from the deterioration which usually accompanies drying after application of the sugar coating and the weight of candy to cereal was 1:1. The product was also free from the burnt taste which is the result of caramelization of the candy. Additional flavoring agents may be added, if desired, such as for instance brown sugar in proportion of 20 pounds per 100 pounds of water and salt in proportion of 2 pounds per 100 pounds of water.

It is possible by suitable adjustment of rate of feed of syrup and of cereal material, to obtain a product with a ratio of 30% candy to 70% cereal material.

Storage tests indicate that the product maintains its uniform glaze even after 6 months' storage. No substantial change of composition was detected during the process of application and the proportion of invert syrup in the finished product did not exceed 18%. The amount of invert syrup in the finished product is preferably 6–12%, but a range up to 18% is still satisfactory.

As the results above indicate, the process of this instant invention provides a product with essentially uniform moisture content usually 3% to 3.5% in the finished product. This value is an average between the higher moisture content of the cereal material, usually in the neighborhood of 4% to 4.5%, and the low moisture content of the candy composition, usually 1% to 2%.

*Comparison between candy-coated cereals prepared by the process of this application and by conventional processes*

In order to evaluate the advantages of the process according to this instant invention, a comparison of the data of the finished products prepared according to the process described here and the conventional processes on a batch scale according to the prior art, is significant. For the purpose of comparison, coated wheat was prepared on a batch scale either at 320°–325° F. during the evaporation step, or on a batch scale at lower temperatures.

A. When the candy coating process is conducted on a batch scale, at 320°–325° F., the amount of reducing sugar varies in different runs, and is usually higher as compared to the product obtained according to the process of this instant invention, as indicated by the table below.

TABLE 1.—COMPARISON BETWEEN CANDY COATED CEREALS WITH SYRUP PREHEATED TO 320°–325° F. (A) ON A BATCH SCALE AND (B) CONTINUOUSLY

[Sample No. 4]

| Sample No. | Cooking Time (mins.) | Temp. (° F.) | Invert Sugar, Percent |
|---|---|---|---|
| 1 | 12 | 320 | 26.7 |
| 2 | 10 | 320 | 26.4 |
| 3 | 9 | 320 | 21.6 |
| 4 | (¹) | 320 | 10 |

¹ 30 seconds continuously.

It is manifest from the above data that keeping the residence time in the cooking zone to a minimum, is essential to the successful operation of the process. The residence time in the evaporating zone, between 20 and 50 seconds, and preferably 30 seconds, has been selected to prevent excessive formation of invert syrup.

B. Variations in the rate of mixing: Comparison of invert syrup between batch runs, under different conditions.

TABLE 2

|  | Mixing applied as soon as the sample was placed on the stove and heated up to 320° F. Total cooking time: 11 minutes. | Mixing not applied until 7 minutes had elapsed after the sample was placed on the stove and heated up to 320° F. Total cooking time: 11 minutes |
|---|---|---|
| Invert syrup as Reducing Sugar, Percent | 11.9 | 15.1 |
| Sucrose, Percent | 79.0 | 74.7 |

The striking differences in the composition of the candy as a result of different mixing conditions, on a batch scale, indicate the necessity of immediate and uniform mixing in the evaporating or cooking zone B.

C. Taste evaluation: Also a comparison of taste of the product obtained in accordance with the process of this instant invention, with the products obtained by conventional processes, batchwise, readily shows the advantages. The product obtained by the conventional batch process, had a burned and acrid taste, while the product according to this instant invention, has a milder and controllable taste, since it is freed of caramelization.

It should be noted that the candy coating obtained according to this instant process, is free of caramelization and that the taste of the finished product may be controlled in different products, according to the nature of the added flavoring agent. If additional flavor is desired in some varieties, it may be added to the syrup after the cooker, or it may be sprayed onto the cereal material, while it travels along the blending zone.

D. Comparison of moisture content of candy syrup, prepared at different temperatures: The advantage resulting from conducting the process at 320°–325° F., is apparent from an examination of the table below which shows the moisture content of the candy composition when evaporated at different temperatures:

TABLE 3

Highest temperature reached
in the evaporating unit, ° F.:     Percent moisture
   230 ------------------------------- 14.22
   240 ------------------------------- 12.50
   250 -------------------------------- 8.89
   260 -------------------------------- 5.2
   280 -------------------------------- 3.8
   300 -------------------------------- 1.7
   320 -------------------------------- 1.2
   330 -------------------------------- 0.9
   340 -------------------------------- 0.2

As the table shows, the temperature of 320° F. permits essentially complete removal of the water from the candy composition.

E. Breakage experiments: The amount of waste as a result of breakage during the application of the coating to the cereal articles is essentially minimized, when the process is conducted at 320°–325° F., as compared to the process in which the temperature is first raised to 320°–325° F., to eliminate all the water, and then cooled again to 250°–270° F.

Several samples of cereals, in addition to wheat, such as corn and rice, were similarly coated according to the process of this instant invention, and also analyzed for moisture, invert syrup, sucrose and total sugar content.

Although a specific embodiment has been illustrated and the results of several tests have been given, it is to be understood that several variations of the process will be apparent to those skilled in the art, and that the scope of the invention is only to be limited by the appended claims.

What is claimed is:
1. A continuous process for the preparation of ready to eat candy-coated cereal articles which comprises the steps of:
 (1) heating an aqueous solution which contains between 10% and 70% of sucrose, between 1% and 30% of honey, between 5 and 25% of invert syrup, between zero and 1% of an acid which is a member selected from the group consisting of acetic, tartaric, citric, adipic, fumaric, and malic acid, between zero and 1% of a buffering agent for said acid, between 5 and 30% of a higher-molecular weight carbohydrate which is a member selected from the group consisting of dextrins, higher molecular weight sugars than disaccharides, and mixtures thereof, to 240°–260° F. for a period of time between 15 seconds and 20 minutes,
 (2) heating said composition from step 1 to 320°–325° F. to evaporate the water in an evaporating zone to give a sugar syrup of residual moisture content between 0.5% and 2% with a residence time in said evaporating zone between 20 and 50 seconds,
 (3) continuously feeding ready to eat cereal articles and said syrup to a blending zone whereby a uniformly coated product is obtained, with a residence time of between 15 and 30 seconds, and continuously removing said coated cereal articles from said blending zone.

2. A continuous process for the preparation of ready to eat candy coated cereal articles from a candy composition which comprises sugar, honey, invert syrup, an acid which is a member selected from the group consisting of acetic, tartaric, citric, adipic, fumaric, and malic acid, and a buffering agent for said acid, which comprises the steps of:
 (1) heating a solution of said sugar, honey, invert syrup, acid, and the buffering agent for said acid to 240°–260° F. for a period of time between 15 seconds and 20 minutes,
 (2) heating said solution from step 1 to 320°–325° F. to evaporate the water thereof to provide a candy syrup, in a cooking zone with a residence time between 20 and 50 seconds,
 (3) continuously feeding said syrup and ready to eat cereal articles to a blending zone, at a predetermined rate whereby a uniformly coated product is obtained.
 (4) continuously removing said coated cereal articles from said blending zone, at a predetermined rate.

3. The process according to claim 2, wherein said solution in step 1 additionally comprises a flavoring agent which is a member selected from the group consisting of salt, brown sugar, and mixtures thereof.

4. The process according to claim 3 wherein said cereal is a member selected from the group consisting of wheat, rice, oats, corn and barley.

5. The process according to claim 2 wherein granulated sugar is dissolved in water and step 1 is conducted in three units.

References Cited by the Examiner
UNITED STATES PATENTS

| 2,196,395 | 4/1940 | Kellogg | 99—134 |
| 2,333,442 | 11/1943 | Rex | 99—83 |
| 2,689,796 | 9/1954 | Massmann et al. | 99—83 |
| 2,707,153 | 4/1955 | Bettman | 99—83 |
| 2,868,647 | 1/1959 | Vollink | 99—83 |

FOREIGN PATENTS 782,832    9/1957    Great Britain.

A. LOUIS MONACELL, *Primary Examiner.*

R. N. JONES, *Assistant Examiner.*